United States Patent Office 2,877,155
Patented Mar. 10, 1959

2,877,155
BENZOXAZOLEMETHYL AND BENZOTHIAZOLE-METHYL PHOSPHORIC ESTERS

Jean Metivier, Arpajon, France, assignor to Societe des Usines Chimiques Rhone-Poulenc, Paris, France, a corporation of France No Drawing. Application November 29, 1957
Serial No. 699,531

Claims priority, application France December 3, 1956

14 Claims. (Cl. 167—33)

This invention relates to new phosphoric esters and to a process for their preparation, and includes industrially useful compositions containing the same.

The new phosphoric esters of the invention conform to the general formula:

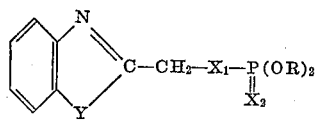

I in which Y, $X_1$ and $X_2$ each represent an oxygen or sulphur atom and R represents an alkyl group containing from 1 to 4 carbon atoms. The fused benzene nucleus may contain one or more substituents in the form of halogen atoms, more especially chlorine and bromine, alkyl and alkoxy groups each containing from 1 to 4 carbon atoms, and nitro groups, in which event the esters are of the formula:

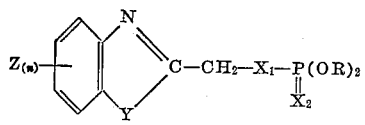

II wherein Z is a substituent as aforesaid, $n$ is an integer and Y, $X_1$, $X_2$ and R are each as hereinbefore defined.

The new esters are obtained, in accordance with a feature of the invention, by condensation of a benzoxazole or benzthiazole of the general formula:

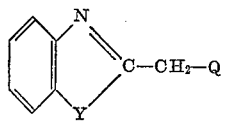

III with a phosphorus derivative of the general formula:

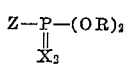

IV one of Q and Z representing the group —$X_1$H and the other a reactive ester residue such as a halogen atom, preferably chlorine or bromine, or a sulphuric or sulphonic ester residue, more especially the para-toluenesulphonic residue, and the other symbols having the meanings hereinbefore set forth.

Specific modes of carrying out the process hereinbefore defined include:

(1) The action of a phosphoric acid halide of the general formula:

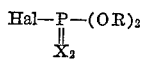

V on a benzoxazole or benzthiazole of the general formula:

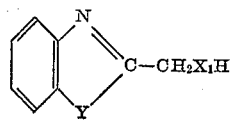

VI

Hal representing a halogen atom, preferably chlorine, and the other symbols being as hereinbefore defined.

The reaction is preferably carried out by heating the reactants to a moderate temperature in an inert solvent in the presence of a basic condensation agent. The inert solvent employed may be, for example, an aromatic hydrocarbon, such as benzene or toluene, a halogenated aliphatic or aromatic solvent, such as chlorbenzene, an ether such as anisole, or a ketone such as acetone or methyl ethyl ketone. The basic condensation agent is preferably an alkali metal or one of its derivatives, such as hydroxide, hydride, amide, carbonate, alcoholate or organo-alkali derivative or a tertiary amine such as pyridine, dimethylaniline, or triethylamine.

(2) The action of a phosphorus derivative of the general formula:

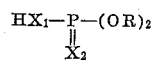

VI on a benzoxazole or benzthiazole of the general formula:

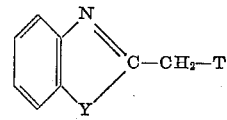

VIII

T representing a reactive ester residue, such as a halogen atom, preferably chlorine or bromine, or a sulphuric or sulphonic ester residue, more especially the para-toluenesulphonic residue, the other symbols being as hereinbefore defined.

The reaction is carried out in the presence of a basic condensation agent, so that the phosphorus derivative reacts in the form of a salt, preferably of an anlkali salt, such as the sodium or potassium salt. It is also preferably effected in an inert organic solvent, such as ethanol, acetone, or methyl ethyl ketone.

The new esters of the invention have been found to possess particularly important pesticidal, more especially insecticidal and acaricidal, properties. For example, they are effective against flies (e. g. *Ceratitis capitata*), mites (e. g. *Paratetranychus pilosus* and *Tetranychus telarius*), aphids (e. g. *Aphis fabae* and *Aphis pomi*), and weevils (e. g. *Centhorrhynchus assimilis*). They may be utilized in any of the physical forms in which pesticidal materials are customarily used, usually in association with one or more compatible diluents. The present invention accordingly includes within its scope a pesticidal composition containing at least one compound of the general formula I and at least one diluent compatible therewith. The composition may be provided in solid form by employing a diluent in the form of a powder compatible solid such as talc, a clay, for example kaolin or bentonite, limestone, calcined magnesia, kieselguhr, tricalcium phosphate, or cork powder, the phosphorus derivative preferably being present in an amount of from 0.005 to 5% based on the weight of the composition. Instead of a solid, there may be employed a liquid in which the phosphorus derivative is dissolved or dispersed, preferably in an amount of from 0.005 to 0.1% based on the weight of the composition. Thus the composition may be provided in the form of an aerosol or a suspension, emulsion, or solution in an organic or aqueous-organic medium, for example an aromatic hydrocarbon such as toluene or xylene, or a mineral or animal or vegetable oil or a mixture of such media. Compositions in the form of dispersions, solutions or emulsions may contain a wetting, dispersing or emulsifying agent of the ionic or non-ionic type, for example sulphoricinoleates, quaternary ammonium derivatives or products based on ethylene oxide condensates such as condensates of ethylene oxide with octylphenol or fatty acid esters of anhydrosorbitols which have been solubilised by etherifying the free hydroxyl groups with ethylene oxide. Agents of the non-ionic type are preferred since they are not affected by electrolytes. When use of emulsions is contemplated, the phosphorus derivatives may be formulated as a self-emulsifying concentrate containing the active substance dissolved in the dispersing agent or in a solvent compatible with that dispersing agent, the compositions being made ready for use by the simple addition of water.

Compositions of solid form are preferably prepared by crushing the phosphorus derivative with the solid diluent, or by impregnating the solid diluent with a solution of the phosphorus derivative in a volatile solvent, driving off the solvent and, if necessary, crushing the product to form a powder.

The new compounds may be employed in admixture with other pesticides including substances resulting in a synergistic effect. The following examples illustrate the invention. The melting points were determined on the Kofler bench.

*Example I*

52 g. of sodium O:O-dimethyldithiophosphate in a concentration of 94% are added to a suspension of 79.8 g. of 2-hydroxymethylbenzthiazole p-toluenesulphonate in 500 cc. of acetone. After agitation for 1 hour at ambient temperature, the mixture is heated at 50–55° C. for 1¼ hours. The solid formed is filtered off and the clear filtrate is treated with decolourising charcoal. After concentration under reduced pressure, the oily residue is taken up in 100 cc. of benzene. The benzene layer is washed with 175 cc. of water and then dried over sodium sulphate. After treatment with decolourising charcoal, the solvent is driven off under reduced pressure. There then remains an oil weighing 60.5 g. Analysis shows that it is 2-(O:O-dimethyldithiophosphorylmethyl) - benzthiazole. The 2 - hydroxymethylbenzthiazole p-toluenesulphonate is a solid melting at 110° C. It is prepared by the action of p-toluenesulphonyl chloride on 2-hydroxymethylbenzthiazole in suspension in water, in the presence of caustic potash.

The latter product is prepared in accordance with Zubarovskii [C. A., 46, 6640 (1952)].

*Example II*

44.8 g. of potassium O:O-diethyldithiophosphate are added to a solution of 45.5 g. of 2-hydroxymethylbenzoxazole p-toluenesulphonate in 500 cc. of acetone. After agitation for 3 hours at ambient temperature, the solid formed is filtered off and, after treatment with decolourising charcoal, the acetone is driven off under reduced pressure. The residual oil is taken up in 150 cc. of cyclohexane and washed twice with 50 cc. of water. The benzene layer is dried over sodium sulphate and concentrated under reduced pressure, whereafter there remains an oil weighing 37 g. Analysis shows that it is 2-(O:O-diethyldithiophosphorylmethyl)-benzoxazole.

The 2-hydroxymethylbenzoxazole p-toluenesulphonate employed as starting material melts at 90° C. The 2-hydroxymethylbenzoxazole is prepared in a way analogous to that used for 2-hydroxymethylbenzthiazole. It melts at 54–56° C.

*Example III*

To a suspension of 16.5 g. of 2-hydroxymethylbenzthiazole in 7.9 g. of anhydrous pyridine are added 18.9 g. of diethylchlorothiophosphate, the temperature being maintained at about 30–40° C. When the addition is complete, the mixture is agitated for 1 hour at ambient temperature, and then heated at 50° C. for 1 hour. The reaction mixture is taken up in 50 cc. of water and 100 cc. of cyclohexane. The organic layer is dried over sodium sulphate and then concentrated under reduced pressure. The residual oil obtained weighs 20 g. Analysis shows that it is the diethylthiophosphate of 2-hydroxymethylbenzthiazole.

*Example IV*

The mixture prepared from 31.9 g. of 2-hydroxymethylbenzthiazole p-toluenesulphonate, 22.4 g. of potassium diethyldithiophosphate and 250 cc. of acetone is agitated for 5 hours. The potassium toluene-sulphonate which precipitates is filtered off. The filtrate is passed over decolourising charcoal and concentrated under reduced pressure (20–30 mm. Hg) with heating at 40–50° C.

The oily residue obtained is taken up in 150 cc. of benzene. A light insoluble substance separates off. After filtration, the benzene solution is concentrated as hereinbefore indicated. Analysis of the residual oil (31 g.) shows that it is 2-(O:O-diethyldithiophosphorylmethyl)-benzthiazole.

*Example V*

As suspension of 31.9 g. of 2-hydroxymethylbenzthiazole p-toluenesulphonate and 18.2 g. of 90% sodium dimethylthionophosphate in 250 cc. of acetone is agitated for 4 hours. After standing overnight, it is treated as indicated in Example IV.

Analysis of the residual oil (21 g.) shows that it is 2-(O:O-dimethylthiolophosphorylmethyl)-benzthiazole.

*Example VI*

10 g. of 2 - (O:O - dimethylthiolophosphorylmethyl)-benzthiazole are dissolved in 50 cc. of acetone, and 20 cc. of toluene and 15 g. of non-ionic emulsifying agent are added. After agitation, the volume is made up to 100 cc. by means of acetone. A solution containing 10% of active component is thus obtained, which can be converted into an emulsion by the addition of water. In order to obtain, for example, an 0.05% emulsion 1 cc. of the 10% solution is agitated with 200 cc. of water. This composition can be used to combat, for example, the Mediterranean fruit fly (*Ceratitis capitata*), the bean aphid (*Aphis fabae*), or the spider mite (*Tetranychus telarius*).

*Example VII*

A mixture of 2 parts by weight of 2-(O:O-dimethyldithiophosphorylmethyl)-benzthiazole, 3 parts by weight of emulsifying agent and 95 parts of talc is crushed to a fine homogeneous powder. This powder may be used as it is or brought into suspension in water. It can be used to combat the spider mite (*Tetranychus telarius*).

In Examples VI and VII the active compound may be replaced by any one of the other phosphoric esters of the invention.

I claim:

1. A phosphoric ester of the general formula:

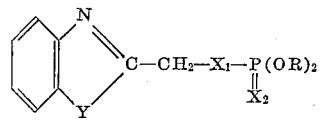

wherein each of Y, $X_1$ and $X_2$ are chosen from the group consisting of oxygen and sulphur atoms, and R represents an alkyl group containing from 1 to 4 carbon atoms.

2. 2-(O:O- dimethyldithiophosphorylmethyl)- benzthiazole.

3. 2 - (O:O - diethyldithiophosphorylmethyl) - benz - oxazole.

4. 2-(O:O-diethylthiophosphorylmethyl-benzthiazole.

5. 2-(O:O - diethyldithiophosphorylmethyl) - benzthiazole.

6. 2-(O:O- dimethylthiolophosphorylmethyl)-benzthiazole.

7. A pesticidal composition which comprises a phosphoric ester of the general formula:

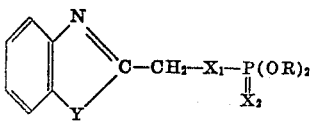

wherein each of Y, $X_1$ and $X_2$ are chosen from the group consisting of oxygen and sulphur atoms, and R represents an alkyl group containing from 1 to 4 carbon atoms in pesticidal concentration diluted with at least one diluent compatible therewith.

8. A pesticidal composition according to claim 7 in which the diluent is a powder.

9. A self-emulsifying pesticidal composition which comprises a phosphoric ester of the general formula:

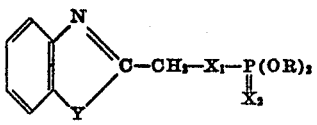

wherein each of Y, $X_1$ and $X_2$ are chosen from the group consisting of oxygen and sulphur atoms, and R represents an alkyl group containing from 1 to 4 carbon atoms in pesticidal concentration, solvent therefor, and an emulsifying agent.

10. A pesticidal composition as claimed in claim 7 in which the phosphoric ester is present in an amount of from about 0.005 to 5% based on the weight of the composition.

11. A pesticidal composition as claimed in claim 9 in which the phosphoric ester concentration lies between 0.005 to 0.1% based on the weight of the composition.

12. A pesticidal composition which comprises 2-(O:O-dimethylthiolophosphorylmethyl)-benzthiazole in pesticidal concentration diluted with at least one diluent compatible therewith.

13. A pesticidal composition according to claim 12 in which the diluent is a powder.

14. A self-emulsifying pesticidal composition which comprises 2 - (O:O - dimethylthiolophosphorylmethyl) - benzthiazole in pesticidal concentration, solvent therefor, and an emulsifying agent.

References Cited in the file of this patent

UNITED STATES PATENTS 2,690,450   Gilbert et al. _ _ _ _ _ _ _ _ _ _ _ _  Sept. 28, 1954

OTHER REFERENCES

Frear et al.: J. of Economic Entomology, vol. 40, pp. 736–41 (1947).